United States Patent [19]

Pridham

[11] 4,213,195

[45] Jul. 15, 1980

[54] SONIC DIRECTION SYSTEM

[75] Inventor: Roger G. Pridham, Providence, R.I.

[73] Assignee: Raytheon Company, Lexington, Mass.

[21] Appl. No.: 676,445

[22] Filed: Apr. 12, 1976

[51] Int. Cl.³ .............................................. G01S 15/06
[52] U.S. Cl. ...................................... 367/92; 367/105; 343/5 SA
[58] Field of Search ............ 340/3 R, 3 A; 343/5 SA; 367/92, 105

[56] References Cited

U.S. PATENT DOCUMENTS

| 3,510,833 | 5/1970 | Turner | 367/92 X |
| 3,613,069 | 10/1971 | Cary, Jr. et al. | 367/92 |
| 3,870,988 | 3/1975 | Turner | 367/92 |
| 3,882,444 | 5/1975 | Robertson | 367/92 |

OTHER PUBLICATIONS

Bellin et al., *Journal of the Acoustical Society of America*, vol. 34, Aug. 1962, pp. 1051–1054.

*Primary Examiner*—Richard A. Farley
*Attorney, Agent, or Firm*—David M. Warren; Joseph D. Pannone; Milton D. Bartlett

[57] ABSTRACT

A system for the determination of the direction of a source of sound in water utilizing the finite amplitude effect. A narrow beam of sonic energy at a frequency higher than that of the source is projected in a direction opposite the direction of the source. A hydrophone receiving beam intercepts the projector beam at a distance from the projector thereof, the distance being sufficient to permit a finite amplitude non-linear interaction of the projector beam energy and the energy of the source via a virtual end-fire array. Cross-modulation products resulting from the non-linear interaction are received by the hydrophone, the precision of measurement being dependent on the directivity pattern of the virtual end-fire array.

5 Claims, 3 Drawing Figures

SONIC DIRECTION SYSTEM

BACKGROUND OF THE INVENTION

This invention relates to finite amplitude sonar systems, and more particularly, to a sonic direction finding system wherein a beam of relatively high amplitude sonic energy is projected in a direction away from a source of sound for determining the direction of the source and characteristics of the sound radiated therefrom.

The detection of underwater sound and the determination of the direction of such a source of sound is accomplished by use of an array of sonic radiating elements which is many times longer than a wavelength of the sound to be measured in order that the array of sonic radiating elements produce a sufficiently narrow directivity pattern to permit a precise measurement of the direction of the source. A problem arises in the case of sources radiating sound at very low frequencies such as, for example, 50 Hz, since the relatively long wavelength of such sound necessitates a receiving sonar array of a prohibitively large size, too large for mounting on many vessels.

SUMMARY OF THE INVENTION

The foregoing problem is overcome and other advantages are provided by a sonar system which, in accordance with the invention, utilizes a projector for generating a beam of sonic energy having an amplitude and a frequency which are greater than the amplitude and frequency of the sound of a source to be measured, and a hydrophone providing a receiving beam which intersects the projected beam of sonic energy at a distance from the projector. The distance between the projector and the intersection of the projector and hydrophone beams is of a sufficient magnitude to permit the interaction of the projected sonic energy with sonic energy radiated from the source via a non-linear finite amplitude effect to produce a virtual end-fire array in the water, the virtual end-fire array producing a radiation pattern at the aforementioned distance which is sufficiently narrow to permit a precise measurement of the direction of the source. Experimental results on the virtual end-fire array and a description of the radiation pattern are described in an article by J. L. S. Bellin and R. T. Beyer in the *Journal of the Acoustical Society of America*, August 1962, Vol. 34, pp. 1051-1054.

The hydrophone may be placed adjacent the projector with a sound baffle therebetween to inhibit coupling of sonic energy from the projector to the hydrophone, or alternatively, the projector and hydrophone may be spaced apart by the hull of the ship such as by placing the projector on the bottom of the hull of a submarine and the hydrophone on the coning tower of the submarine to improve sonic isolation between the projector and the hydrophone. Sonic energy resulting from the non-linear finite amplitude interaction is scattered back to the hydrophone by scattering mechanisms in the water such as the temperature microstructure of the water, plankton or fish therein, suspended particulate matter or bubbles therein, as well as surface waves, a ship's wake or the ocean bottom. The use of the scattering mechanisms within the water permit the novel implementation of a finite amplitude receiving system in which the projector and hydrophone can be placed relatively close together as compared to the relatively long length of the interaction region between the projected pump energy and the source radiated energy for which the direction thereof is to be determined. Beam shaping circuitry as well as the aforementioned baffle prevent the coupling of sonic energy from a region, closer than the aforementioned distance, about the projector and thereby insure the narrow radiation pattern associated with a long end-fire array.

In a preferred embodiment of the invention, the signal received by the hydrophone, namely, the cross-modulation products of the non-linear interaction wherein the relatively low frequency components of the source appear alongside the carrier frequency of the projected radiation, is processed by a notched filter to remove the carrier followed by a spectrum analyzer which produces a signature of the source.

It is noted that, while this invention will be described with reference to a system utilizing acoustic energy, it is believed that the description is also applicable for electromagnetic energy propagating in a non-linear medium, an electromagnetic wave of 10 MHz frequency having a 30 meter wavelength as does an acoustic wave of 50 Hz frequency.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENTS

Figure 1:
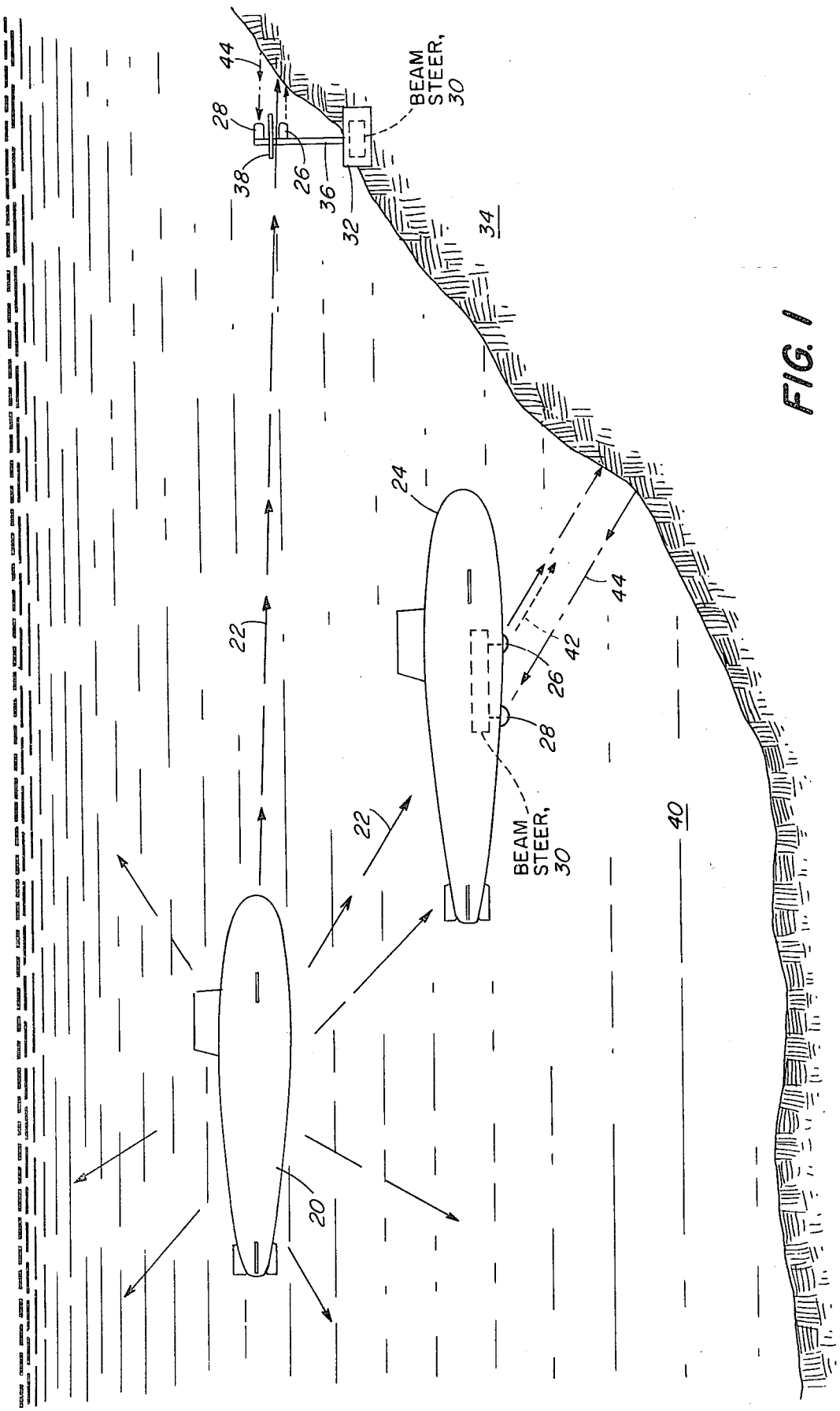
FIG. 1 is a stylized pictorial view of a submarine carrying a projector and hydrophone in accordance with the invention for determining the direction of sound emanating from a second submarine, the figure also showing a stationary bottom-mounted station incorporating a hydrophone and projector for determining the direction of distant source of sound.

Referring now to FIG. 1, there is seen a source 20 of sound which, by way of example, is portrayed as a submarine but which may be any other type of vessel or device, the source 20 radiating sound at a low frequency such as 50 Hz and which is designated in the figure by long arrows 22. A submarine 24 carries a projector 26 and a hydrophone 28 which are coupled together by a beam steering unit 30. A station 32 fixedly mounted in the ocean bottom 34 also supports a projector 26, a hydrophone 28 and a beam steering unit 30 as does the submarine 24, the projector 26 and hydrophone 28 being positioned by a mast 36 and having a baffle plate 38 positioned therebetween to attenuate sonic energy radiating from the projector 26 to the hydrophone 28.

With respect to both the submarine 24 and the station 32, the projector 26 radiates sonic energy at a high frequency of, for example 50 kHz, through the ocean water 40 in a direction opposite the direction of the source 20, the high frequency sonic energy being designated by dotted arrows 42. Cross-modulation products of the non-linear interaction between the sonic radiations represented by the arrows 22 and 42 are portrayed in the figure by arrows 44 having a dot-dash format. The arrows 44 are shown directed toward the interface between the water 40 and the ocean bottom 34 from whence the sonic radiation represented by the arrows 44 is reflected back towards the hydrophones 28. In addition to being reflected from the interface between the water 40 and the bottom 34, the sonic radiation is also reflected from other scattering mechanisms within the water 40 such as plankton and suspended particulate matter. In the case of the submarine 24, the radiation represented by the arrows 44 is seen to reflect directly off the interface between the water 40 and the ocean bottom 34, while in the case of the station 32, the radiation represented by the arrows 44 is scattered back to the hydrophone 28 at a glancing angle to the interface between the water 40 and the bottom 34, the scattering mechanism being provided by particles of sand along the interface.

The beam steering unit 30, to be described in further detail with reference to FIG. 3, may direct the beams of the projector 26 and hydrophone 28 in a scanning pattern for surveillance of the ocean until low frequency sonic energy such as that of the source 20 is detected whereupon the beam steering unit 30 is manually operated in a tracking mode for tracking the direction of the source 20. The intensity of signals received by the hydrophone 26 may vary in accordance with the direction of the source 20 due to a variation in the scattering mechanism. For example, a relatively strong signal is reflected by a scattering mechanism such as the sand of the ocean bottom 34 and by a school of fish while a smaller intensity of reflective radiation may be obtained from suspended particulate matter. However, whether the scattering mechanism be temperature microstructure, plankton, bubbles or other mechanisms mentioned hereinabove, these is sufficient intensity of radiation scattered back toward the hydrophone 28 to permit the measurement of the direction of the source 20.

Figure 2:
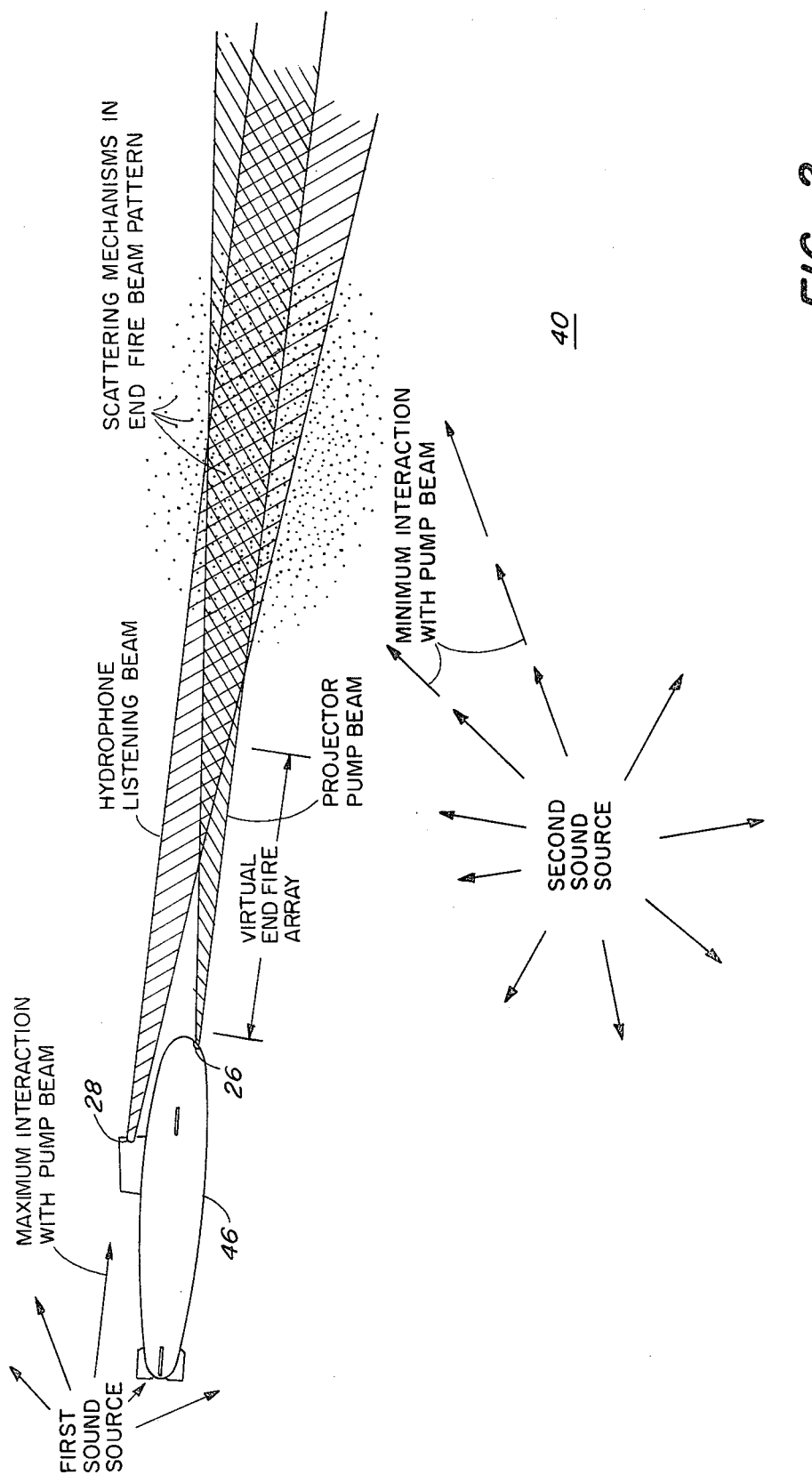
FIG. 2 is a stylized pictorial view showing the intersection of the hydrophone and projector beams at a distane from the projector to provide for a virtual end-fire array in front of the projector.

Referring now to FIG. 2, there is seen a submarine 46 carrying the projector 26 on its bottom side while carrying the hydrophone 28 on its coning tower whereby the hull of the submarine 46 acts to separate the hydrophone 28 and projector 26 so as to attenuate sonic radiations propagating from the projector 26 to the hydrophone 28. The listening beam from the hydrophone 28 is seen to intersect the pump beam of transmitted radiant energy from the projector 26 in a region shown by cross-hatching in the figure. The beginning of the intersecting region of the two beams is at a distance from the projector 26 to provide space for the generation of the virtual end-fire array in the water 40. The pump beam is seen to have an axis which intersects a first source of sound to interact therewith in the region of the virtual end-fire array. A second source of sound located off to the side of the pump beam radiates sonic energy which has no more than a minimal interaction with the radiation of the pump beam, the reaction of the second source radiation being sufficiently small so that it may be neglected. This is in accordance with the directivity pattern of an end-fire array which provides its maximum response along the axis of the array and a minimum response in the direction perpendicular to the axis. The figure also shows scattering mechanisms represented by small dots located in and about the region of intersection of the two beams, the scattering mechanisms being located in the region of maximum response of the virtual end-fire array to reflect back the cross-modulation products of the non-linear interaction to the hydrophone 28.

A feature of the invention is seen in FIG. 2 in that the radiation received at the hydrophone 28 contains data of the first sound source because of the interaction of its radiation with the pump beam, but contains virtually no data of the second sound source because of the minimal interaction of its radiation with the pump beam. In this way, the scattering of interaction cross-modulation products from a region ahead of the virtual end-fire array toward the hydrophone 28 produces a highly directive system which can discriminate in direction between the first and the second sound sources. It is noted that any radiation scattered from within the region of the virtual end-fire array and incident upon the hydrophone 28 decreases the directivity of the array as viewed by the scattering mechanisms and the hydrophone 28. The beam steering unit 30, as will be described with reference to FIG. 3, includes circuitry which shapes the hydrophone radiation pattern to ensure that there are substantially no sidelobes prematurely intersecting the projected beam.

It is also noted that the invention provides for an additional feature, namely that the first source of sound may actually be a source of sound within the submarine 46 such as the engine and screws which propel the submarine 46. The diagrammatic presentation of the listening and pump beams applies also to noises produced within the structure of the submarine 46 which supports the hydrophone 28 and the projector 26. Thus, the invention also serves the useful purpose of analyzing the signature of noise radiated from the submarine 46 as viewed from a distance therefrom, the distance being the distance of the scattering mechanism from the submarine 46.

Figure 3:
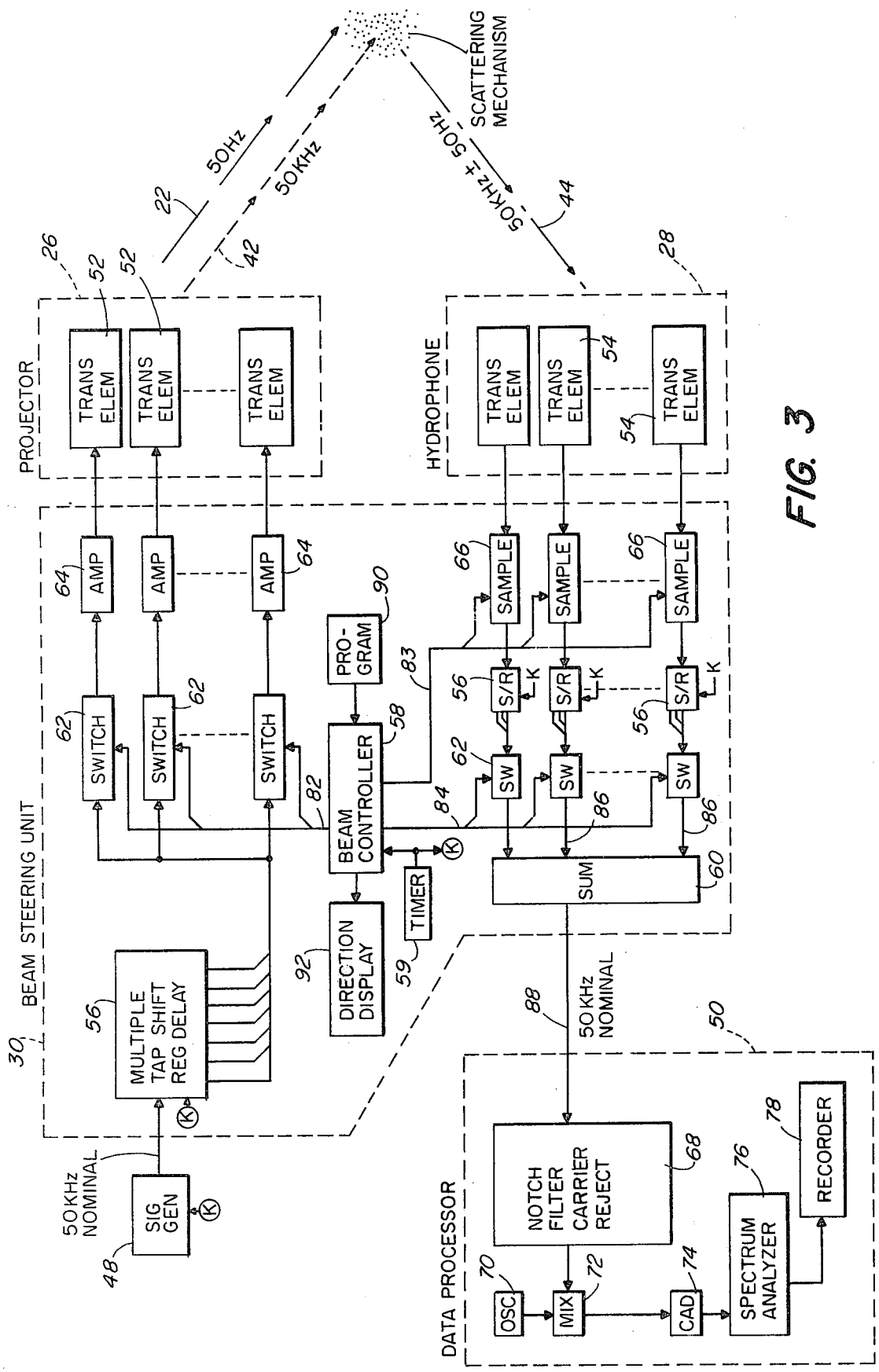
FIG. 3 is a block diagram of a beam steering unit of FIG. 1 for steering the hydrophone and projector beams, FIG. 3 also showing a data processor for analyzing signals received by the hydrophone.

Referring now to FIG. 3, there is seen a block diagram of the beam steering unit 30 and its interconnections with the projector 26 and the hydrophone 28 of FIG. 1, and with a signal generator 48 and a data processor 50. The projector 26 is seen to comprise an array of transducer elements 52 whereby the projected beam may be steered, and the hydrophone 28 is similarly seen to comprise an array of transducer elements 54 whereby the receiving beam can be steered. By way of example, only three transducer elements 52 are shown in the projector 26 and only three transducer elements 54 are shown in the hydrophone 28, it being understood that many more transducer elements, for example one hundred elements in an array of ten elements by ten elements, are often utilized. The beam steering unit 30 is seen to comprise multiply tapped shift registers 56 fabricated as a charge coupled device (CCD), a beam controller 58, a timer 59, a summer 60, selector switches 62, power amplifiers 64, and sampling circuits 66. The data processor 50 comprises a notched filter 68, an oscillator 70, a mixer 72, a converter from analog-to-digital hereinafter referred to as CAD 74, a spectrum analyzer 76, and a recorder 78.

Each shift register 56, being a charge coupled device, serves as a delay medium of analog signal samples by providing a set of delays which are individually selectable by a switch 62. Thus, a sample of a signal provided by the signal generator 48, in response to timing pulses at terminal K by timer 59, passes through the shift register 56 and is extracted at any one of its taps, shown by the line 80 fanning into each of the taps, by individual ones of the switches 62 in accordance with control signals supplied thereto via line 82 from the beam controller 58. The signals on line 80, as selected by the switches 62, are then filtered and amplified by the amplifiers 64 to a magnitude of power sufficient for driving the transducer elements 52 to generate the pump beam of sonic energy. Filtering within the amplifiers 64, as by a low pass filter, removes the sample spectra and provides a continuous waveform.

Signals received by the receiving beam are coupled via the transducer elements 54 to the sampling circuits 66 which selectively amplify these signals to a suitable amplitude for operation of the shift registers 56 and provide analog samples of the received signals to the shift registers 56. The selective amplification within each of the sampling circuits 66 is provided in accordance with control signals fanning out from line 83 of the beam controller 58 to each of the sampling circuits 66. The selective amplification weights the signals from individual ones of the transducer elements 54 to reduce sidelobes directed toward the beam of the projector 26. The shift registers 56 and the switches 62 coupled to the outputs thereof provide a variable delay to the received signal in the same manner as described above for the transmitted signal, the control for the switches 62 for the received signal being provided by line 84 of the beam controller 58. The delayed received signals are coupled via lines 86 to the summer 60 which sums together the signals to provide signals of the receiving beam on line 88. The delays imparted to the transmitted signal by the beam controller 58 provides for the generation of wavefronts from the individual elements 52 which combine to provide a wavefront of the projected beam in a direction as designated by the beam controller 58. Similarly, the delays imparted to signals received by each of the elements 54 are delayed so that their summation on line 88 provides a receiving beam having a direction as designated by the beam controller 58.

A signal generator 48 provides a sinusoidal signal which, in the foregoing example, is at a frequency of 50 kHz. The frequency provided by the signal generator 48 is selectable so as to interact with sources of differing frequencies. In the foregoing example, the 50 kHz signal frequency interacts with the 50 Hz signal of the source 20 of FIG. 1. The signal on line 88 has a spectrum wherein the carrier line is at 50 kHz and spectral lines appear at ±50 Hz centered on the 50 kHz carrier.

The filter 68 is preferably a crystal filter having a band rejection notch at the 50 kHz area to remove the carrier component. In the event that the frequency of a generator 48 is to be varied, a tracking filter may be utilized instead of the crystal filter 68 for attenuating the carrier spectral line. The output of the filter 68 is combined with a sinusoidal signal from the oscillator 70 and a mixer 72 which translates the spectrum of the signal on line 88 to a lower value of frequency, for example 5 kHz. The output of the mixer 72 is then sampled and converted to a series of digital numbers by the CAD 74 and applied to the spectrum analyzer 76. The spectrum analyzer 76 provides a display on the recorder 78 showing the spectral lines of the signal emitted by the source 20. The beam controller 58 may be programmed by a programmer 90 to provide a series of commands on the lines 82 and 84 for scanning the beams of the projector 26 and hydrophone 28 in a prescribed manner for searching a region of the ocean of FIG. 1, the programmer 90 permitting manual control of the beam controller 58 to permit tracking of the source 20. The direction of the source 20 and of the projector beam of the projector 26 are indicated on a display 92.

It is understood that the above described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A system for measuring the direction of a source of radiant energy in a non-linear medium propagative of such radiant energy comprising:
    means for projecting a beam of said radiant energy in a direction opposite said source;
    means for directing a receiving beam into said projected beam to receive radiant energy scattered back toward said directing means by scattering mechanisms within said non-linear medium, said medium inducing a non-linear interaction between said projected beam of radiant energy and energy radiated by said source;
    means for inhibiting the coupling of radiant energy into said receiving beam from a region within said projected beam, said region being between said projecting means and a predetermined distance therefrom, said predetermined distance being longer than a virtual end-fire array produced by said non-linear interaction; and
    means coupled to said directing means for extracting data from signals of radiant energy within said receiving beam.

2. A system according to claim 1 wherein the radiation frequency of said projected radiant energy is greater than the radiation frequency of said source energy, said extracting means further comprising means for filtering said received signal to obtain a signature of a signal radiated by said source.

3. A system according to claim 2 wherein said radiated energy is sonic energy.

4. A system according to claim 2 further comprising means for scanning said projected beam for locating said source.

5. A system according to claim 2 wherein said filtering means includes means for providing a spectrum analysis of a signal radiated by said source.

* * * * *